Patented Jan. 4, 1944

UNITED STATES PATENT OFFICE 2,338,482

PROCESS FOR PRODUCING N-SUBSTITUTED AMINOPHENOLS

Frederic R. Bean, Rochester, N. Y., assignor to Eastman Kodak Company, Rochester, N. Y., a corporation of New Jersey No Drawing. Application April 3, 1937, Serial No. 134,903

8 Claims. (Cl. 260—574)

This invention relates to N-substituted aminophenols and to motor fuels stabilized against deterioration therewith.

It is known that N-aralkylaminophenols can be prepared by treating aminophenols with aralkyl halides. For example, N-benzyl-p-aminophenol can be prepared by reacting p-aminophenol with benzyl chloride. This method of preparing N-aralkylaminophenols suffers from the formation of side-reaction products, e. g., N,N-diaralkylaminophenols. These side-reaction products can be removed only with considerable difficulty. It has been proposed to prepare N-alkylaminophenols in a similar manner from alkyl chlorides and aminophenols. However, such a method requires the use of high temperatures, owing to the lower reactivity of the alkyl chlorides. In addition the yields are poor and the N-alkylaminophenol, if formed, is contaminated with side-reaction products, decomposition products and unreacted aminophenol. Separation of the N-alkylaminophenols is an involved and tedious procedure. It has also been proposed to prepare N-substituted aminophenols from N-aralkylidene aminophenols or N-alkylidene aminophenols by treatment thereof with alkali and zinc. This method suffices fairly well for the production of N-aralkylaminophenols, but is less satisfactory for the preparation of N-alkylaminophenols.

Now I have found a method for preparing N-substituted aminophenols which gives rise to products of good purity and which is particularly adapted to the preparation of N-alkylaminophenols containing at least two carbon atoms in the alkyl group. By my new process, heretofore unknown N-alkylaminophenols having unusual properties can be made. These new N-alkylaminophenols are useful as photographic developers and are particularly adapted to the manufacture of motor fuels stabilized against deterioration, I have found.

An object of my invention, therefore, is to provide a process for preparing N-substituted aminophenols. A further object is to provide new N-alkylaminophenols. A still further object is to provide motor fuels stabilized against deterioration with such new N-alkylaminophenols and a process for preparing such stabilized motor fuels. Other more specific objects will appear hereinafter.

According to the process of my invention, an aminophenol is reacted with an aldehyde of two or more carbon atoms, in the presence of a strong base and aluminium. The aldehyde probably reacts with the aminophenol to form a compound of the following formula:

I.  R—CH=N-phenylene—OH wherein R represents an organic group. (I) is then reduced immediately by the action of the strong base and aluminium to give a N-substituted aminophenol. In a less preferred embodiment of my invention, a compound of Formula I can be used as a starting material. However to obtain higher yields, I have found it necessary to effect the reduction of the intermediate compound as quickly as possible. N-aralkylaminophenols can be prepared by my new process but the process is particularly adapted to the preparation of N-alkylaminophenols from aminophenols and aliphatic aldehydes which form intermediate compounds of the type I but slowly.

While the process of my invention lends itself to variation and modification in the manner of its practical application, particularly as regards the nature of the strong base, the form of the aluminium, the proportions of reacting materials and agents used in the reaction, the temperatures and the exact method of procedure, the following examples will serve to illustrate how the process can be practiced.

EXAMPLE 1.—*N-ethyl-p-aminophenol*

218 g. (2 mol.) of p-aminophenol were dissolved in 5000 cc. of water containing 142 g. (3.5 mol.) of sodium hydroxide. The solution was placed in a vessel equipped with a means of stirring and the air in the vessel was displaced with a non-oxidizing atmosphere, such as hydrogen or nitrogen. The solution was cooled to about 5° C. and 90.5 g. (2 mol. with slight excess) of acetaldehyde were added. 100 g. of activated aluminium were added gradually while cooling and stirring rapidly. After addition of the aluminium, the reaction mixture was stirred rapidly for from two to three hours at about 25° C. The reaction mixture was then made just acid with sulfuric acid. The resulting solution was concentrated to a volume of about 2000 cc. and decolorized with activated charcoal. Upon cooling the decolorized solution N-ethyl-p-aminophenol sulfate separated out after standing.

Upon dissolving the sulfate in water and making just alkaline with sodium carbonate mixed with a little sodium sulfite, N-ethyl-p-aminophenol separated out in the form of white crystals melting at 111° to 112° C. Its nitroso derivative melts at 81° to 83° C. with decomposition. The formula for N-ethyl-p-aminophenol is:

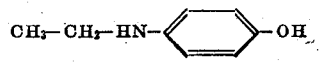

EXAMPLE 2.—*N-(n-primarybutyl)-p-aminophenol*

218 g. (1 mol.) of p-aminophenol were dissolved in 5000 cc. of water containing 142 g. (3.5 mol.) of sodium hydroxide. The solution was placed in a vessel equipped with a means of stirring and the air in the vessel displaced with a non-oxidizing gas such as hydrogen or nitrogen. The solution was cooled to about 5° C. and 152 g. (2 mol. with small excess) of n-butyraldehyde were added. While cooling and stirring vigorously, 100 g. of activated aluminium were added gradually. After addition of the activated aluminium, the reaction mixture was stirred rapidly for from two to four hours at about 25° C. The reaction mixture was then made just acid with sulfuric acid. The resulting solution was concentrated to a volume of about 2000 cc. and decolorized with activated charcoal. Upon cooling the decolorized solution N-(n-primarybutyl)-p-aminophenol sulfate separated out.

Upon dissolving the sulfate in water and making the solution just alkaline with sodium carbonate mixed with a little sodium sulfite, N-(n-primarybutyl)-p-aminophenol separated out in the form of fine white crystals melted at 70° to 71° C. Its nitroso derivative melted at 87° to 89° C.

The formula for N-(n-primarybutyl)-p-aminophenol is:

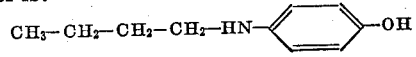

It can be converted into its salt, such as its hydrochloride, by treating with aqueous solutions of the corresponding acids. I have found this substance to be a photographic developer and useful for inhibiting or retarding the deterioration of motor fuels.

EXAMPLE 3.—*N-(n-primaryamyl)-p-aminophenol*

218 g. (2 mol.) of p-aminophenol were dissolved in 5000 cc. of water containing 142 g. (3.5 mol.) of sodium hydroxide. The solution was placed in a vessel equipped with a means of stirring and the air in the vessel displaced with a non-oxidizing gas, such as hydrogen or nitrogen. The solution was cooled to about 5° C. and 173 g. (2 mol.) of n-valeraldehyde were added. While cooling and stirring vigorously, 100 g. of activated aluminium were added gradually. After addition of the activated aluminium, the reaction mixture was stirred rapidly for from two to four hours at about 25° C. The reaction mixture was then made just acid with sulfuric acid. The resulting solution was concentrated to a volume of about 2500 cc. and decolorized with activated charcoal. Upon cooling the decolorized solution, N-(n-primaryamyl)-p-aminophenol separated out.

Upon dissolving the sulfate in water and making the solution just alkaline with sodium carbonate mixed with a little sodium sulfite, N-(n-primaryamyl)-p-aminophenol separated out in the form of white crystals melting at about 73° C. Its nitroso derivative was an oil which did not solidify.

The formula for N-(n-primaryamyl)-p-aminophenol is:

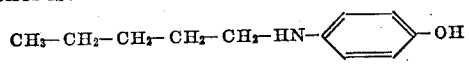

I have found this substance to be a photographic developer. This substance is also useful for retarding the deterioration of motor fuels.

EXAMPLE 4.—*N-(2-ethyl-n-primarybutyl)-p-aminophenol*

218 g. (2 mol.) of p-aminophenol were dissolved in 5000 cc. of water containing 142 g. (3.5 mol.) of sodium hydroxide. The solution was placed in a vessel equipped with a means of stirring and the air in the vessel displaced with a non-oxidizing gas, such as hydrogen or nitrogen. The solution was cooled to about 50° C. and 200 g. (2 mol.) of 2-ethylbutanal were added. While cooling and stirring vigorously, 100 g. of activated aluminium were added gradually. After addition of the activated aluminium, the reaction mixture was stirred rapidly from two to four hours at about 25° C. The reaction mixture was then made just acid with sulfuric acid. The resulting solution was concentrated to a volume of about 2500 cc. and decolorized with activated charcoal. Upon cooling, the decolorized solution N-(2-ethyl-n-primarybutyl)-p-aminophenol sulfate separated out.

Upon dissolving the sulfate in water and making the solution just alkaline with sodium carbonate mixed with a little sodium sulfite, N-(2-ethyl-n-primarybutyl)-p-aminophenol separated out in the form of white crystals melting at 98°–99°. Its nitroso derivative was an oil which did not solidify. The formula of N-(2-ethylbutyl)-p-aminophenol is:

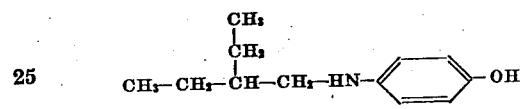

This new substance is an excellent motor fuel stabilizer serving to inhibit or retard deterioration thereof, I have found. In a similar manner N-(2-methyl-n-primarybutyl)-p-aminophenol can be prepared from 2-methylbutanal and p-aminophenol. This 2-methyl compound is likewise a good motor fuel stabilizer.

In a manner similar to that illustrated in the above examples aldehydes of two or more carbon atoms can be reacted with other aminophenols, e. g., m-aminophenol, 1-amino-2-methyl-4-hydroxybenzene, 1-amino-3, 4-dihydroxy benzene or the like. Benzaldehyde, salicylaldehyde or the like can be reacted with aminophenols as illustrated.

The strong base employed in my process is advantageously an alkali, such as sodium or potassium hydroxide. Lithium hydroxide can also be used. Quaternary ammonium hydroxides, such as benzyltrimethyl ammonium hydroxide, can likewise be used. Aqueous strong bases are particularly useful, though methyl alcoholic or other solutions of strong bases can be employed.

The aldehyde and aminophenol are ordinarily employed in equimolecular proportions, though an excess of aldehyde can be employed. The strong base should be employed in quantity sufficient to dissolve the aminophenol and to react with the aluminium to generate sufficient hydrogen to form the N-substituted aminophenol.

The starting temperature is advantageously less than 10° C., the range 0° to 10° C. being suitable. During the process the reaction mixture can advantageously be held below 10° C., being allowed to rise slowly at the end of the process to around 25° C. ordinarily, although it can be held below 10° C. throughout. The temperature can be allowed to rise above 25° C. though this is generally less satisfactory.

It is advantageous to carry out my process in the absence of oxidants, such as oxidizing gases, e. g., air. However, it is not essential to displace the air in the reaction vessel, owing to the hydrogen which escapes during the process. The sodium sulfite employed in the above examples is to offset oxidation by air while precipitating the N-substituted aminophenols. The sodium sulfite can be replaced by sodium hydrosulfite or by corresponding potassium salts.

The aluminium reacts with the strong base generating hydrogen and dissolves in the excess strong base. Upon acidification with sulfuric acid the aluminium remains in solution as alum while the N-substituted aminophenol sulfate separates out. The aluminium is advantageously in a finely divided or activated form, in order to assure rapid reaction. The aluminium is advantageously added gradually to the reaction mixture. A convenient method of preparing an activated aluminium is as follows: 100 g. of aluminium in the form of small flakes, were treated in 10 g. portions with a solution of mercuric chloride, i. e. the 10 g. portion was added to 30 to 40 cc. of water containing 0.17 g. of mercuric chloride with stirring while cooling. The stirring was continued for about 10 minutes until the temperature rose to about 25° to 30° C. The so-prepared aqueous mixture was then employed, without separation of the activated aluminium, to add to the reaction mixture containing aminophenol, aldehyde and strong base.

The N-substituted aminophenols prepared by my process separate from the reaction mixture in a pure form. They can be recrystallized if desired from suitable solvents.

I have found that motor fuels stable to deterioration can be prepared employing N-(n-primarybutyl)-aminophenols or N-(2-alkyl-n-primarybutyl)-aminophenols. Hydrocarbon distillates and more particularly those hydrocarbon distillates known in the petroleum trades as cracked hydrocarbon distillates or motor fuels made therefrom are ordinarily characterized by a tendency to undergo deterioration manifested by a loss in knock-rating, the formation of color or the formation of gummy or resinous materials. This deterioration is undesirable, since it is important to preserve the knock-rating of a motor fuel and the gummy or resinous material tends to deposit in the induction system of the carburetor and intake valves impairing or even preventing the operation of the motor. The formation of color impairs the marketing of the motor fuel. I have found that deterioration in motor fuels can be substantially inhibited or retarded by dispersing a small amount of one or more N-(n-primarybutyl)- or N-(2-alkyl-n-primarybutyl) aminophenols in the hydrocarbon distillate or motor fuel. I have found that my new stabilizers are especially advantageously employed in preparing motor fuels stabilized against gum or resinous materials formation, which formation may or may not be attended by a loss of knock-rating and/or color formation in the absence of a stabilizer (inhibitor).

My new stabilizers are applicable to any motor fuel comprising hydrocarbons which normally, i. e. without stabilization, undergoes deterioration, particularly deterioration characterized by gum or resinous material formation. Such motor fuels are commonly referred to in the trades under such names as gasoline, petrol, and the like, and contain in part or in whole unstable constituents such as unsaturated hydrocarbons of various sorts. My new stabilizers are particularly useful for stabilizing unsaturated hydrocarbon products or distillates, useful as motor fuels, produced by cracking higher boiling hydrocarbon oils, as well as for stabilizing blends of such products or distillates with the so-called straight-run distillates from petroleum. My new stabilizers are likewise useful for stabilizing hydrocarbon products, useful as motor fuels, produced by cracking or destructive distillation of substances containing carbon and hydrogen, but containing a lesser proportion of hydrogen than petroleum oils, such as bituminous materials, for example, coal, peat, lignite and the like. My new stabilizers are also useful for stabilizing hydrocarbon products, useful as motor fuels, produced by the polymerization of unsaturated hydrocarbons, such as butenes, pentenes and the like.

The tendency of a motor fuel or hydrocarbon product to form gum or resinous products can be determined, among other methods, by an accelerated oxidation test. While there are various methods of carrying out such a test, the method described by Egloff, Morrell, Lowry and Dryer in Industrial and Engineering Chemistry, vol. 24, pages 1375–1378 (1932) is very satisfactory and widely used. Briefly the described method is as follows: A sample of the motor fuel or hydrocarbon products, to be tested, in an open eight-ounce bottle, is placed in a suitable metal bomb surrounded by a water-bath. Oxygen is introduced to 100 pounds per square inch (7 kng. per sq. cm.) pressure. The both is then heated by steam to 100° C. As the temperature increases the pressure rises, reaches a maximum and continues near this maximum for a shorter or longer period of time. The test is continued for four hours or until a break in the pressure curve is noted. The period from slightly before attainment of maximum pressure (approximately 15 minutes from the beginning of heating) until more than a slight drop in pressure takes place (usually a sharp break in the pressure curve occurs) is recorded as the induction period.

An induction period of less than 75 minutes is usually indicative of very low stability, while an induction period of 300 or more minutes for freshly made motor fuels or hydrocarbon products produced by cracking usually represents a fuel possessing stability suitable for from about six to about twelve months' bulk storage in the northern half of the United States. For more southern and warmer climates the induction period should be increased somewhat for satisfactory bulk storage of about a year's duration. The induction period should always be determined on the freshly prepared motor fuel or hydrocarbon product, since the induction period determined on partially aged material is probably not a reliable test.

The efficacy of my new stabilizers as inhibitors or retardants of the deterioration of motor fuels is shown in the following table.

*Table*

| | Inhibitors | |
|---|---|---|
| | N-(n-primary-butyl)-p-aminophenol | N-(2-ethyl-n-primarybutyl)-p-aminophenol |
| Percent conc. in motor fuel | 0.0025 | 0.0025 |
| Induction period of standard reference fuel (min.) | 245 | 140 |
| Induction period of stabilized motor fuel (min.) | 635 | 480 |
| Increase in induction period due to inhibitor (min.) | 390 | 340 |

From these data it is clear that my new inhibitors produce excellently stabilized motor fuels. My new inhibitors are superior to N-methyl-p-aminophenol in that they are much more soluble in motor fuels comprising hydrocarbons, much more resistant to extraction by water and/or alkalies therefrom and show a markedly decreased tendency to impart or induce color and/or turbidity therein. N-(2-methyl-n-primarybutyl)-p-aminophenol is similar to the 2-ethyl compound in its motor fuel stabilizing potency, solubility, resistant to extraction and tendency to induce color and/or turbidity.

My new inhibitors show practically no tendency to separate from alcoholic solutions at lower temperatures and in this respect are also superior to the inhibitors of the prior art. This is an important advantage because it is customary to dissolve inhibitors in alcohols, such as methyl alcohol, transport the solutions of the inhibitors and add the solutions to motor fuels to produce stabilized motor fuels. Any tendency of the inhibitor to separate from solution would clearly seriously hamper the handling of such solutions.

The quantity of my new stabilizers (inhibitors or retardants) which should be added to the motor fuel or hydrocarbon product will depend upon the nature of the N-(n-primarybutyl)-aminophenol or N-(2-alkyl-n-primarybutyl)-aminophenols, the type of motor fuel being stabilized and the conditions of storage. Ordinarily an amount of my new stabilizers equal to 0.01 g. to about 1.0 g. per 1000 g. of motor fuel or hydrocarbon product, i. e. from about 0.001% to about 0.1% by weight, will suffice. Usually each motor fuel or hydrocarbon product to be stabilized will require a separate test, the details of making which are described above. Modifications of the hereinabove described test and other tests are well known to those skilled in the art.

My new stabilizers should be added to the freshly prepared motor fuel or hydrocarbon product, since partially aged materials usually cannot be effectively stabilized. When stabilizing smaller quantities of motor fuel, up to 2000 barrel lots, my new stabilizers can be introduced directly into the tank or other container of freshly prepared motor fuel, by adding the stabilizer portionwise, using small portions, while vigorously agitating the stock being treated or causing the same to circulate, for instance, by pumping the contents of the lower part of the container to the top. In adding my new stabilizers to larger batches of motor fuels, the stabilizer can be added on the suction side of the pump in the form of a slurry in the motor fuel, or by means of a suitable feeding device, to a stream of the motor fuel passing to storage. The quantity of stabilizer added in such a manner should always be well below its maximum solubility in the motor fuel, and the pipe line to the storage tank should be long enough to allow the stabilizer to dissolve before it reaches the storage tank. My new stabilizers can be added to motor fuels in the form of solutions of the stabilizers in solvents which are miscible or but partially miscible with the ordinary motor fuel. Agitation and circulation are advisable during the addition. Solutions in methanol are satisfactory. In all cases it is advantageous to have the stabilizers completely dissolved in the motor fuel.

What I claim as my invention and desire to be secured by Letters Patent of the United States is:

1. A process comprising reacting with an alkali metal hydroxide and activated aluminium a compound of the following formula:

wherein R represents an alkyl group of at least two carbon atoms.

2. A process comprising reacting with an aqueous alkali metal hydroxide and activated aluminium, at from about 0° to about 10° C., a compound of the following formula:

wherein R represents an alkyl group of at least two carbon atoms.

3. A process comprising reacting, in the presence of an aqueous alkali metal hydroxide and activated aluminium, n-butyraldehyde with p-aminophenol.

4. A process comprising reacting, in the presence of an aqueous alkali metal hydroxide and activated aluminium, n-valeraldehyde with p-aminophenol.

5. A process comprising reacting, in the presence of an aqueous alkali metal hydroxide and activated aluminium, a 2-alkylbutanal with p-aminophenol.

6. A process comprising reacting, in the presence of an aqueous alkali metal hydroxide and activated aluminium, 2-ethylbutanal with p-aminophenol.

7. The process which comprises reacting in the presence of a strong base and aluminum, an aldehyde from the group consisting of lower alkyl aldehydes and aldehydes of the benzene series with an aminophenol.

8. The process which comprises reacting in the presence of an aqueous alkali metal hydroxide and activated aluminum, an aldehyde from the group consisting of lower alkyl aldehydes and aldehydes of the benezene series with aminophenols, at a temperature from about 0° C. to about 10° C.

FREDERIC R. BEAN.